Feb. 24, 1959   E. F. HIGGINS   2,874,938
END FITTINGS FOR SUCKER RODS HAVING A FLOWABLE BINDER
Filed Jan. 9, 1956

INVENTOR
EDWARD F. HIGGINS
BY
ATTORNEY

United States Patent Office 2,874,938
Patented Feb. 24, 1959

2,874,938

END FITTINGS FOR SUCKER RODS HAVING A FLOWABLE BINDER

Edward F. Higgins, Kirkwood, Mo.

Application January 9, 1956, Serial No. 558,030

4 Claims. (Cl. 255—28)

This invention relates to oil well sucker rods and particularly to the attachment of steel end fittings to lightweight rods composed of longitudinal structural fibers, such as glass, held together by plastic binder materials such as resins.

The general purposes to be achieved hereby are similar to those disclosed in my co-pending application Serial No. 548,934 filed November 25, 1955, entitled "Corrosion-Resistant Sucker Rod and Method of Constructing Same."

The detailed objects of the present invention include: to attached rugged, preferably corrosion-resistant, metal end fittings on a corrosion-resistant, resin-and-glass rod; to employ the flow characteristics of the rod binder material to achieve sound adhesive bonds to the fittings; to take advantage of the rough surface finish which accompanies ordinary machining of steel sockets, to achieve secure mechanical interlock between the fittings and the rods; and to provide a new light weight, corrosion-resistant sucker rod suited for joining to similar rods in long chains for pumping deep wells.

For the achievement of these objects and others which will be apparent from this specification, I provide a new sucker rod joined by adhesive bonds and swaging, as illustrated in the accompanying drawings, in which:

Figure 2 is a sectional view corresponding to Figure 1, showing the completed structure at one end of the rod, the other end being similar;

Figure 1:
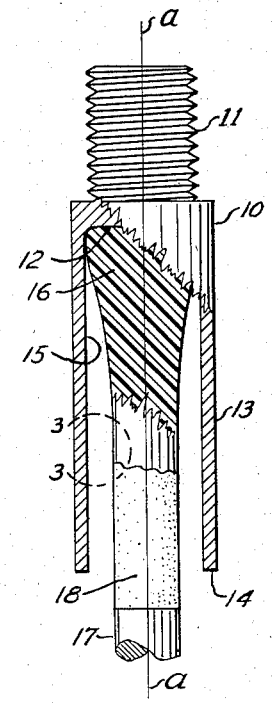
Figure 1 is a side view, partly in elevation and partly in section, of one end of the rod coated with adhesive and inserted into the end fitting therefor, prior to swaging.

The rod end fitting generally designated 10 is preferably formed of corrosion-resistant steel as a screw machine part turned about a central axis of symmetry a—a. It includes a tip connector portion 11, preferably externally threaded for connection to similar rods so as to form a "chain," as is used for pumping oil wells. From the base of the connector portion 11 projects what may be described as an axially formed socket commencing with an end wall 12 perpendicular to the axis a—a, which serves as the socket face, and a hollow cylindrical socket wall 13, which terminates in a margin referred to as the socket end opening 14.

The cylindrical socket wall 13 is of such thickness, considering its diameter, as to be suited for swaging onto the rod 17 hereafter described. The wall 13 has a tubular inner socket surface designated 15, preferably formed by such screw machine operation. In conventional practice, such a surface would be brought to as smooth a finish as costs would permit. Contrary to such thinking, in the present embodiment the surface 15 is preferably left minutely ridged by tool marks as shown enlarged and exaggerated in Fig. 3. Care is taken to avoid only deep, sharp gouges which might precipitate fatigue failure.

Figure 1 further shows one flared or bell-shaped end 16 of a sucker rod generally designated 17. The rod 17 consists of material whose principal structural strength lies in longitudinally-aligned fibers, such as long glass fibers, held together by a binder material, such as plastic resin, of a type adapted to flow somewhat under pressure without cracking the rod or injuring the longitudinal fibers. It is preferably formed by molding, so that the flared or bell-shaped ends 16, which are annular with respect to the rod 17, may be formed with it in a single operation. As an alternative, material for the rod may be initially formed straight, as by extruding plastic resin about skeins of longitudinally-aligned glass fibers, then cutting straight rods 17 to desired length, replasticizing their ends or otherwise spreading them, and solidly filling the ends to the annularly enlarged, flared or bell-shape shown. The largest diameter of said ends 16 is but slightly less than the inner diameter of the cylindrical socket wall 13. The extent of annular enlargement may be determined by experiment to be adequate for strength without requiring excessive swaging.

Before their insertion into the fittings 10, each end portion 16 of the rod 17 is coated with a layer of adhesive 18, preferably of the type adapted to "set" under pressure or under both pressure and heat. Typical are rubber-base adhesives which form reliable bonds to steel surfaces where both heat and pressure may be employed. Such adhesive may also be applied to the inner socket surface, but such additional coating is now shown. Note also that, for clarity, the sectional view Figure 2 does not show any adhesive layer.

Adhesive bonds utilizing such a rubber-base adhesive, as well as those made with other types of adhesive, glues, cements and bonding agents, ordinarily require that the adhesive be applied in a uniform, thin layer, and be "set" (and heat-cured, where suitable) under positive, even pressure. I achieve such pressure by swaging the cylindrical socket wall 13 to press tightly about and grasp the rod 17. The tight grasp which accompanies swaging exerts sufficient force on the rod 17 to cause the resin binder material of the rod 17 to flow plastically, thus exerting fluid-like pressure outward against the adhesive layer 18. Under such pressure, the adhesive is set and heat-cured. The pressure which reacts the reduction in diameter is a direct function of the amount by which the diameter is reduced; hence by controlling the diameter reduction, utilizing conventional roll-swaging equipment, the exact pressure required for setting the adhesive is developed in the flowable binder of the rod 17.

Figure 2:
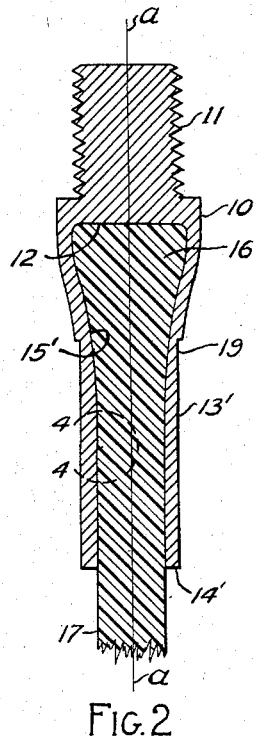
Figure 3:
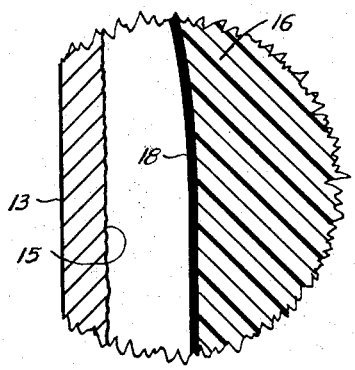
Figure 3 is an enlarged fragmentary view of the region indicated by line 3—3 of Figure 1.

The precise reaction to swaging may now be described. Figure 2 shows one flared end 16 of the rod 17 with a fitting 10 swaged thereon. In Figure 3 the surfaces to be bonded are shown, including a somewhat exaggerated presentation of the tool-marked inner socket surface 15; while Figure 4 shows the surface after swaging.

Figure 4:
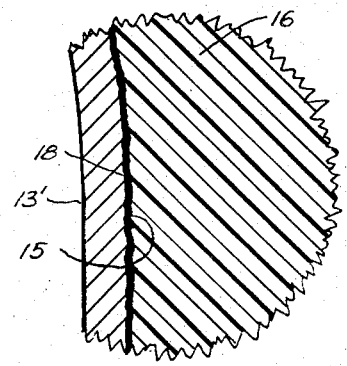
Figure 4 is an enlarged fragmentary view of the region indicated by line 4—4 of Figure 2.

As the cylindrical socket wall 13 is swaged and in effect "shrunk" onto the rod end 16, it loses its cylindrical shape and becomes the flared socket wall 13' shown in Figures 2 and 4. Its end opening decreases from the diameter of the cylindrical wall 13 to a smaller diameter; thus the end opening 14 of Figure 1 becomes the shrunk end opening 14' of Figure 2.

Under the pressure incident to swaging, the binder material of the rod 17 flows locally, changing the formerly smooth molded surface contour of the flared end 16 to a locally irregular contour precisely mating with that of the inner socket surface 15. This evens the thickness of the adhesive layer 18, spreads it uniformly, and exerts a steady, substantially uniform outward pressure, which is reacted by the now flared socket wall 13'. This steady pressure is well suited to develop maximum strength in the adhesive layer 18.

Further, the flow of the resin binder of the rod 17, as shown in Figure 4, into the minute, somewhat annular tool marks of the inner socket surface 15, results in a degree of mechanical interlock with the surface of the rod end 16. This effect of swaging differs markedly from the conventional swaging of a steel fitting onto a steel rod wherein joint strength depends upon the frictional engagement of two smooth surfaces; wherefore such surfaces are machined as smoothly as is economically feasible. In the present invention, the flow of the rod binder to conform the surface contours of the flared rod end 16 to the minute tool marks in the surface 15, achieves a degree of mechanical fit, which may be difficult to evaluate but nevertheless appears to be substantial.

It is understood that the swaging operation is controlled to avoid damage to the longitudinal fibers of the rod 17 by severe pinching. Controls on the extent of swaging are familiar in the art of metal-working.

After swaging, wrenching faces or flats 19 are formed opposite each other in the outer wall of the flared socket wall 13'. Such flats are used to connect and disconnect several such sucker rods to and from each other.

Resin-and-glass-fiber rods as have been described are inherently resistant to corrosion and fatigue. Since only a small amount of steel is required for end fittings, it may be of high quality corrosion-resistant steel. Thus is provided a simple, inexpensive sucker rod which is far superior to those currently in use.

Various modifications of the present invention will occur to those familiar with the art. The present invention should not be construed narrowly, but as fully coextensive in scope with the claims which follow.

I claim:

1. A sucker rod assembly comprising a rod having annularly enlarged ends fabricated of longitudinal structural fibers and plastic resin binder material of type adapted to flow under pressure, in combination with a metal rod end fitting having a threaded tip connector portion, and a hollow socket portion including a rod-receiving opening and an inner socket surface tapering enlargingly from said opening sufficiently to accommodate the enlarged rod end, together with a layer of pressure-set adhesive between the inner socket surface and the outer surface of the rod.

2. A method whereby pressure-setting adhesive is used to join a rod including binder material adapted to flow under pressure, to and within a metal end fitting having a rod-receiving socket portion, comprising the steps of applying a coating of pressure-setting adhesive to the surfaces to be joined, inserting the end of the rod within the socket portion, and swaging the socket portion about the rod end with sufficient force to cause plastic flow of the binder material, by which flow pressure is exerted on the adhesive bond coating sufficient to set the adhesive.

3. A method whereby pressure-setting adhesive bond material is used to join a rod including binder material adapted to flow under pressure, to and within a metal end fitting having a roughly-surfaced rod-receiving socket portion, comprising the steps of applying a coating of pressure-setting adhesive bond material to the surfaces to be joined, inserting the end of the rod within the socket portion and swaging the socket portion about the rod end sufficiently to cause plastic flow of the binder material in reaction thereto, thereby re-shaping the surface of the rod end within the socket to conform more closely to the rough surface thereof and causing the adhesive coating to be thinned substantially uniformly and set under the pressure of the flow of the binder material reacting the swaging.

4. A method whereby a pressure-setting adhesive is used to join the enlarged end of a first member formed of material deformable under pressure, to and within the socket end of a second member formed of a harder material deformable by swaging, comprising the steps of applying a coating of pressure-setting adhesive to the surfaces to be joined, inserting the enlarged end of the first member within the socket end of the second member, and swaging the socket end about the enlarged end to reduce the internal volume of the socket to that of the enlarged end of the first member, thus deforming the enlarged end to the precise contour of the socket as reduced, and by such swaging and deformation, creating pressure on the adhesive coating sufficient to set it.

References Cited in the file of this patent

UNITED STATES PATENTS

| Number | Name | Date |
|---|---|---|
| 764,943 | Guy | July 12, 1904 |
| 1,169,642 | Heeter | Jan. 25, 1916 |
| 2,059,867 | Hinds | Nov. 3, 1936 |
| 2,372,048 | Auxier | Mar. 20, 1945 |
| 2,564,695 | Johnson, Jr. et al. | Aug. 21, 1951 |
| 2,584,696 | Graham | Feb. 5, 1952 |
| 2,732,423 | Morrison | Jan. 24, 1956 |